June 3, 1947.  G. A. LYON  2,421,383
WHEEL COVER
Filed June 2, 1943
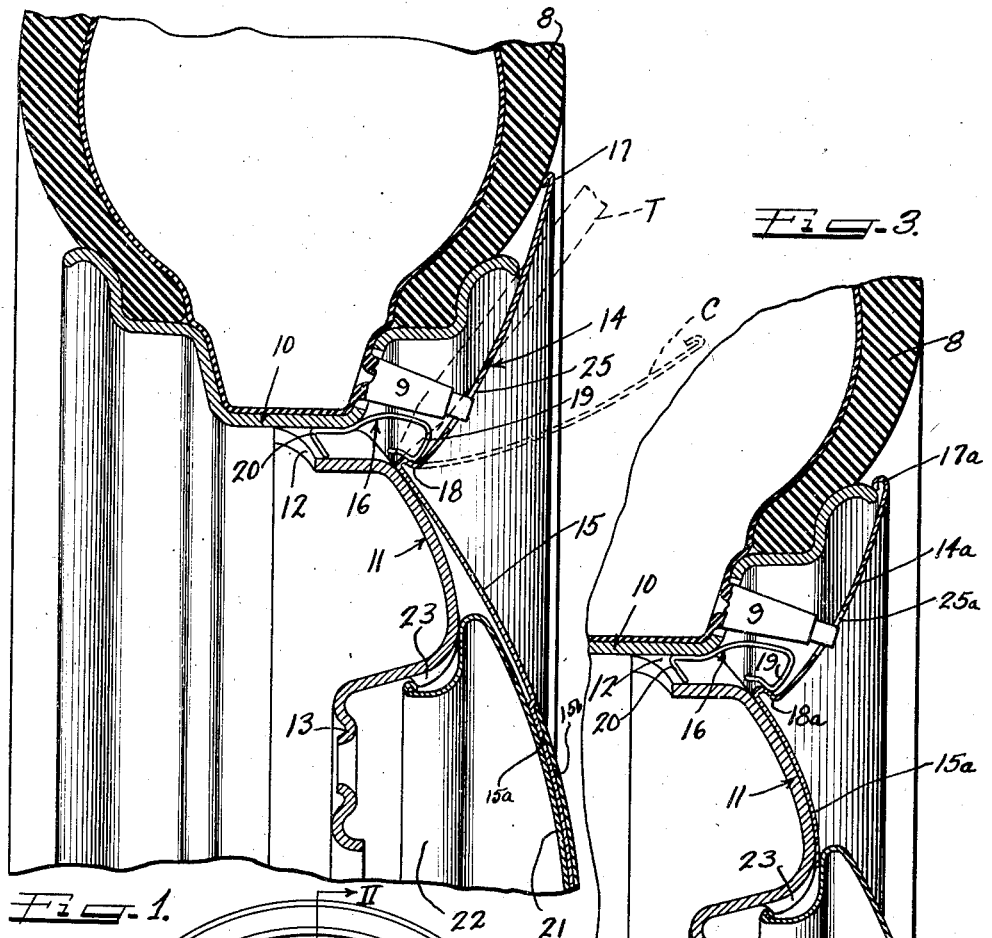
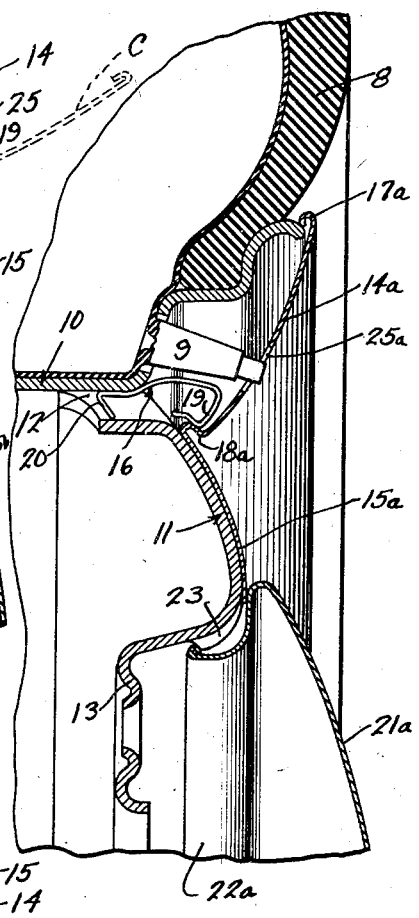
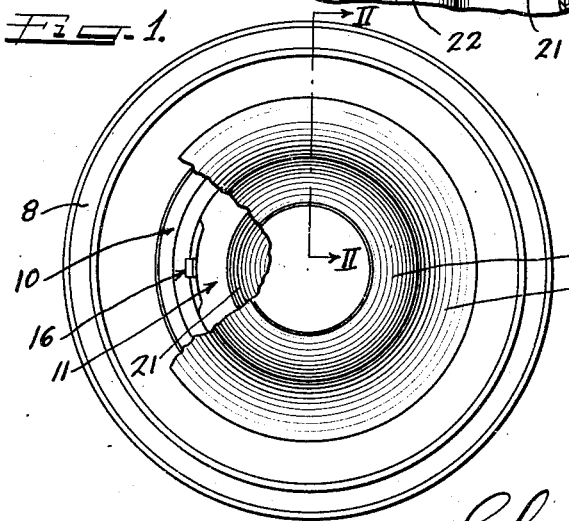
Inventor
GEORGE ALBERT LYON.
by Charles W. Hills Attys Patented June 3, 1947

2,421,383

UNITED STATES PATENT OFFICE 2,421,383

WHEEL COVER

George Albert Lyon, Allenhurst, N. J.

Application June 2, 1943, Serial No. 489,307

2 Claims. (Cl. 301—37)

This invention relates to a wheel construction and more particularly to a novel cover therefor which in use is manually deflectable without permanently distorting the same for the purpose of enabling the cover to be pried free of the wheel.

An object of this invention is to provide an improved and simplified wheel cover for a wheel which will blend in with the appearance of an automobile wheel and which may be finished so as to cause the wheel to have the appearance of a large tire extending clear down to the central body part of the wheel.

Another object of this invention is to provide an improved simplified form of plastic cover which is properly reenforced for attachment to the wheel and is also manually flexible at points to permit of the application of a pry-off tool to a portion of the cover at the rear side of the cover and which also includes a central portion arranged to be properly backed up by the wheel so that it will resist accidental distortion.

In accordance with the general features of this invention, there is provided in a wheel structure including a multi-flanged tire rim and body parts having cover retaining projections and a central hub cap, a wheel cover therefor comprising an outer annular ring section for concealing flanges of the rim part and having a central section for disposition over the body part, these sections being made of resilient deflectable form retaining material joined together by a rearwardly projecting shoulder arranged to be cammed over and into retaining cooperation with the wheel projections, the outer section being manually deflectable in use away from the wheel to permit a pry-off tool to be inserted therebehind for engaging the shoulder to pry the cover free of the wheel.

Another feature of the invention relates to the provision of a cover of a resiliently flexible material and which is so constructed as to be properly reenforced with its point of fastening to the wheel and is also provided at a contour at its center which will enable it to be properly backed up by either a portion of the wheel or a hub cap of the wheel.

Other objects and features of this invention will more fully appear from the following detailed description, taken in connection with the accompanying drawings which illustrate several embodiments thereof, and in which Figure 1 is a side elevation of a wheel provided with the wheel construction of my invention and which elevation is partly broken away to show the location of the spring retaining clips;

Figure 2 is an enlarged fragmentary cross-sectional view taken on the line II—II of Figure 1 looking in the direction indicated by the arrows, and showing in dotted lines how the outer ring section of the cover may be manually deflected to permit of the introduction of a pry-off tool behind the cover to pry it free of the wheel; and Figure 3 is a sectional view similar to Figure 2 showing a modification of the invention.

As shown on the drawings:

The reference character 8 designates generally a conventional drop-center type of tire having the usual inner tube provided with a valve stem 9 projecting laterally through one of the flanges of a multi-flanged conventional drop-center tire rim 10. The tire rim part 10 is supported by and connected to the usual central wheel body or spider part 11. This body part 11 is connected at spaced intervals as is well known in the art to the base flange of the rim part, leaving openings 12 between the points of attachment. These openings, as is well known in the art, are for the purpose of providing ventilation through the wheel or, in other words, to provide for the circulation of air through the wheel around the brake drum.

The body part 11 has the usual central wheel attaching flange 13 by means of which the wheel may be bolted to a suitable support on the axle of an automobile. It will also be perceived that the central part of the body part is dished to accommodate a hub cap which will be described hereinafter.

Associated with this wheel is a cover construction embodying the features of this invention and which comprises two sections 14 and 15. These two sections are integral and are made of a resilient form retaining deflectable material such, for example, as a plastic material. In other words, the material that is employed has sufficient stability that it will normally return to a predetermined shape after each flexure of the same, and yet when flexed will not be permanently distorted. The material is also of such character that the outer ring section 14 may be flexed from the full line position to the dotted line position C to permit of the introduction of a pry-off tool T shown in dotted lines behind the ring section when it is desired to pry the cover free of the wheel.

In order to retain this cover on the wheel there is provided a plurality of projections on the wheel which in the illustrated embodiment comprise a plurality of identical spring clips 16. These spring clips 16 are each wedged in an opening 12 of the wheel and embrace an outer looped or goose-neck extremity 19 over which an intermediate shoulder 18 of the wheel cover is adapted to be cammed into retaining cooperation therewith. The rear extremity of each of the clips comprises a turned or inclined end 20 which is wedged in the opening between the two wheel parts, or in other words is wedged between the rim part 10 and the body part 11. When in position it has a biting engagement with the body part and is backed up by the base of the rim part. The outer goose-neck extremity 19 of each of these clips is resiliently flexible as the shoulder 18 of the cover is cammed over the free end thereof, and when the cover is pressed home against the body part, exerts a resilient clamping pressure on the shoulder to tightly hold it against the body part 11. This arrangement is such that an easy-on hard-off action is provided. In other words, the cover may be pushed on very easily, but is difficult to remove, due to the angular relationship of the projecting retaining means, which feature has been covered in previously issued patents granted to me.

The intermediate annular shoulder 18 of the wheel cover is of a dual advantage. It provides for the retention of the cover on the wheel by the spring clips, and in addition provides for rigidification of the cover at its point of application to the wheel projecting means.

When the cover is pressed axially home in retained cooperation with the wheel, it will be perceived from Figure 2 that the central section 15 is backed up by the body part 11. In addition, the centermost part of the cover is backed up by the outer face of the usual metal hub cap 21. This metal hub cap, as is known in the art and in my previously issued patents, has a rearwardly projecting flexible continuous skirt 22 adapted to be cammed home into retaining cooperation with a plurality of spaced bumps 23 carried by the dished central portion of the body part 11.

In addition, the wheel cover and more particularly the outer section 14 is provided with an outer lip having a smooth turned outer edge 17 adapted to overlie a portion of the side wall of the tire considerably beyond the flanges of the tire rim part 10. By disposing this edge 17 radially outward of the outermost edge of the tire rim part, it is possible to cause this section particularly in view of its cross-sectional contour, to appear to be a part of the outer side wall of the tire. This is particularly true when the external surface of the ring portion 14 is finished white, in which event the tire is caused to have the appearance of having a white side wall that extends clear down to the junction of the two sections 14 and 15. The central section may, of course, if it is so desired, be given a different external finish from that of the outer ring section 14.

By providing the turned edge 17 with a very smooth finish or coating, it is possible to minimize the wear as between the surface of the tire and the surface of this edge.

It should also be noted that the ring section 14 is provided with an aperture 25 which is adapted to receive the outer extremity of the valve stem 9. When it is desired to get to the valve stem for the purpose of introducing air therein, the portion of the ring section about the aperture 25 may be manually deflected inwardly to a slight extent for the purpose of enabling the application of the hose nozzle to the valve stem.

In Figure 3 I have illustrated a modification of the invention wherein the wheel construction is identical to that of Figure 2, and hence the same numerals have been employed in these two figures to identify corresponding and identical parts. The cover retaining means or clips 16 are also identical to those of Figure 2, and the same numerals have been used to designate the corresponding parts of the cover clips.

The difference between this modification and the previously described form resides in the construction of the cover. A cover like that of Figure 2 is made of the same flexible plastic type of material as was described before. The cover embraces two concentric annular sections 14a and 15a, the outermost one of which has a turned outer edge 17a which instead of extending into a lip, merely overlaps the outermost extremity of the flange of the rim part 10. The outer ring section also has an aperture 25a which is for the same purpose as the aperture 25.

The two ring sections 14a and 15a are joined by an intermediate shoulder 18a for cooperation with the spring retaining clips 16 in the same manner as the shoulder 18 cooperates with the spring clips.

The central section 15a instead of extending clear across the hub cap is formed to follow the contour of the body part 11 so that it may be backed up in its entirety by the body part when the cover is pressed home into retaining cooperation with the spring clips. The inner edge of this central section 15a is adapted to extend under the margin of the hub cap 21a so that it may be clamped to the body part by the hub cap 21a when the skirt 22a of the hub cap is pressed into retaining engagement with the spaced protuberances 23.

One of the attributes of the form of my invention shown in Figure 2 includes the provision of a depressed portion 15a in the central part of the portion 15 of the trim member. This depressed central portion is arranged to receive a disk 15b formed preferably from a rigidifying material, which disk may serve as an ornamental medallion which further protects the relatively frangible cover member. The protection afforded by the disk 15b will be evident from the fact that it covers the axially outermost portion of the wheel structure, and thus the portion which is most susceptible to abrasion and indentation by engagement or contact with curbing or other obstructions against which the vehicle may be driven.

I claim as my invention:

1. In a wheel structure including tire rim and body parts having cover retaining projections in the form of resilient clips operative to bear in resilient cover retaining relation toward the wheel body part adjacent the juncture of the rim and body parts, a wheel cover comprising an outer annular section for concealing the rim part and extending to the body part radially inwardly of and adjacent to said clips, and an inner circular section for disposition over the body part and also extending to the radially inner side of the clips in face-to-face relation to the body part, said sections being made of resilient deflectable form retaining material integrally joined together by an axially inwardly and radially outwardly projecting rigidifying juncture fold resting at its axially inner side against the body part and at its axially and radially outer side providing a shoulder arranged to be cammed over into retaining cooperation with said clips whereby the juncture fold is pressed toward and tightly against the body part, said outer section being manually flexible to be swung open about a pivot at the shoulder and away from the wheel to permit a pry-off tool to be inserted therebehind for engaging behind said juncture shoulder to pry the cover from the wheel, the outer edge of said outer section being disposed to be conveniently manually accessible adjacent the outer edge of the tire rim for effecting said manual deflection.

2. A wheel structure as defined in claim 1 wherein a valve stem projects outwardly from the tire rim and said outer annular cover section has the outer surface thereof close to the tip of the valve stem to afford maximum protection therefor and to maintain a smooth exterior appearance substantially uninterrupted by the valve stem, said outer annular cover member having a valve stem aperture and being manually depressible to pivot inwardly at said shoulder to permit the application of air supplying means to the valve stem.

GEORGE ALBERT LYON.

REFERENCES CITED

The following references are of record in the file of this patent:

UNITED STATES PATENTS

| Number | Name | Date |
| --- | --- | --- |
| 2,193,106 | Lyon | Mar. 12, 1940 |
| 2,239,367 | Lyon | Apr. 22, 1941 |
| 2,076,789 | LeJeune | Apr. 13, 1937 |
| 2,148,995 | Nelson | Feb. 28, 1939 |
| 2,158,125 | Horn | May 16, 1939 |
| 2,298,669 | Wood | Oct. 13, 1942 |
| Re. 21,296 | Lyon | Dec. 12, 1939 |
| 2,109,671 | Lyon | Mar. 1, 1938 |
| 2,193,104 | Lyon | Mar. 12, 1940 |
| 2,317,393 | Lyon | Apr. 27, 1943 |
| 2,190,669 | Lyon | Feb. 20, 1940 |
| 1,234,387 | Pugh et al. | July 24, 1917 |
| 2,188,911 | Lyon | Feb. 6, 1940 |